US005139315A

United States Patent [19]

Walenty et al.

[11] Patent Number: 5,139,315

[45] Date of Patent: Aug. 18, 1992

[54] VEHICLE PARKING BRAKE SYSTEM AND METHOD

[75] Inventors: Allen J. Walenty, Mt. Clemens; George N. Villec, Ann Arbor, both of Mich.

[73] Assignee: General Motors Corporation, Detroit, Mich.

[21] Appl. No.: 661,976

[22] Filed: Feb. 28, 1991

[51] Int. Cl.[5] .......................... B60T 13/66; B60T 8/78; B60T 8/32; G06F 7/70

[52] U.S. Cl. .......................................... 303/95; 303/20; 303/100; 303/91; 303/104; 364/426.02

[58] Field of Search ..................... 192/4 C, 9; 303/20, 303/100, 91, 92, 93, 94, 95, 104, 107, 97, 99, 106, 108; 364/426.02; 180/97

[56] References Cited

U.S. PATENT DOCUMENTS 4,561,527 12/1985 Nakamoto et al. ................. 192/4 C
4,629,043 12/1986 Matsuo et al. ...................... 192/4 A
4,671,579 6/1987 Swano et al. ........................ 303/20
4,753,131 6/1988 Wupper ................................ 303/20
4,871,215 10/1989 Takayama ........................... 303/100
4,930,083 5/1990 Hoashi et al. ........................ 303/20

*Primary Examiner*—Joseph F. Peters, Jr.
*Assistant Examiner*—Kenneth Lee
*Attorney, Agent, or Firm*—Howard N. Conkey

[57] ABSTRACT

A vehicle parking brake system automatically adapts to the road surface condition when operated while the vehicle is moving. The parking brake pressure is automatically controlled, in response to an operator command to initiate the parking brake function or in response to a failure of the hydraulic front brakes while the vehicle is moving, to establish and limit wheel slip at a desired controlled slip between each of the braked wheels and the road surface so as to automatically adapt to the road surface coefficient of friction.

7 Claims, 3 Drawing Sheets

ENTER BRAKE CONTROL — 32
33: • READ AND SAVE INPUTS • DETERMINE VEH. SPD.
34: PARKING BRAKE SWITCH ON ? — NO / YES
36: PARKING BRAKE DISENGAGED ? (T=0) — YES / NO
38: DEAD MAN SWITCH ON ? — YES / NO
106: ENERGIZE EMB'S
108: Pf = Pf + PfRAMP
48: PARKING BRAKE ENGAGED ? (T=10) — YES / NO
60: ENERGIZE EMB'S
40: BRAKE PEDAL SWITCH ON ? — YES / NO
50: ENERGIZE EMB'S
62: • APPLY PARK BRAKE DISENGAGE CURRENT • T = T - 1
52: VEHICLE SPEED = 0 ? — YES / NO
64: • Pf = Pf + Pf RAMP • SET SLIP THRESHOLD = P.B. SLIP THRESHOLDS
42: • CLEAR $I_C$ COMMANDS • RESET SLIPS • CLEAR ABS FLAGS
66: ENTER ABS ROUTINE
56: EMB'S DEENERGIZED ? (E=0) — YES / NO
46: ABS FLAG ON ? — NO / YES
58: • DEENERGIZE EMB'S • E = E - 1
112: REDUCE ABS SLIP TRESHOLDS
54: • APPLY P.B. ENGAGE CURRENT • T = T + 1
110: ENTER ABS ROUTINE
44: EXIT

VEHICLE PARKING BRAKE SYSTEM AND METHOD

BACKGROUND OF THE INVENTION

This invention relates to a vehicle parking brake system.

Typically, the parking brake function of a vehicle takes the form of a manually operated brake in which the amount of parking brake pressure is regulated by the vehicle operator. When this form of parking brake is operated while the vehicle is moving, excessive slip of the braked wheels leading to a wheel lockup condition may be avoided by the vehicle operator by consciously avoiding application of parking brake pressure giving rise to an excessive slip condition. However, this is difficult in view of the fact that when the critical slip value producing a peak braking effort is exceeded, the braked wheel rapidly decelerates toward lockup.

Recently, it has been proposed to automatically apply the parking brake in response to the actuation of a switch by the vehicle operator. In one such system, the brake pressure is controlled, when the switch is operated while the vehicle is moving, to establish a target vehicle deceleration until the vehicle stops after which the brake pressure is increased to maintain maximum braking force. In this form of parking brake system, an excessive slip condition will result if the target vehicle deceleration cannot be achieved on the particular road surface. For example, if the road surface coefficient of friction is low such as when the road surface is covered with ice, the maximum achievable vehicle deceleration is low. If the target vehicle deceleration is greater than this maximum possible vehicle deceleration, the brake pressure controlled in an attempt to achieve this target vehicle deceleration will result in the critical slip being exceeded and the wheel being decelerated toward lockup. To avoid this condition by setting a low target vehicle deceleration results in a lower than possible deceleration on higher coefficient of friction surfaces.

SUMMARY OF THE INVENTION

This invention generally provides for a vehicle parking brake system and method that automatically adapts to the road surface condition when operated while the vehicle is moving.

In one aspect of the invention, the parking brake pressure is automatically controlled, in response to an operator command to initiate the parking brake function while the vehicle is moving, to establish and limit wheel slip at a desired controlled slip between each of the braked wheels and the road surface so as to automatically adapt to the road surface coefficient of friction.

In another aspect of the invention, the parking brake function is enabled in response to a sensed failure in the main vehicle braking system while the main braking system is operated to provide for controlled braking of the vehicle.

In one form of the invention, the main vehicle braking system includes hydraulic front brakes and electric rear brakes wherein the electric rear brakes are also controlled to provide the parking brake function. In this form, a failure of the hydraulic front brakes and the rear electric brakes are controlled to provide controlled braking of the vehicle in accord with the parking brake routine.

DESCRIPTION OF THE DRAWINGS

The invention may be best understood by reference to the following description of a preferred embodiment and the drawings in which.

DESCRIPTION OF THE PREFERRED EMBODIMENT

Figure 1:
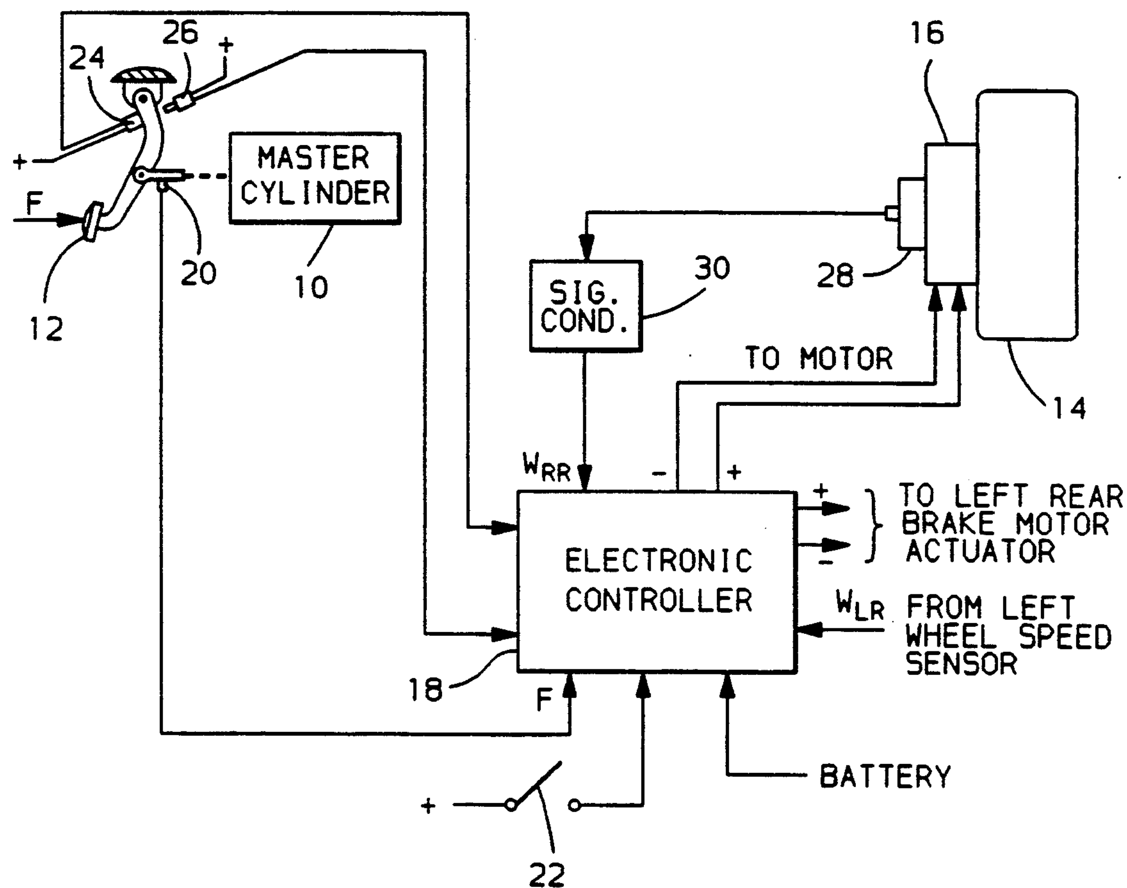
FIG. 1 is a diagram of a wheel braking system including an electronic controller for controlling the vehicle rear brakes to apply parking brake pressure.

Referring to FIG. 1, there is generally illustrated a vehicle braking system in which the front wheels are braked by a conventional hydraulic braking system including a master cylinder 10 actuated by a conventional brake pedal 12 by application of a force F by the vehicle operator to apply hydraulic pressure to the front wheel brakes. The rear wheels of the vehicle in the preferred embodiment are braked by a pair of electrically operated brakes. Only the right rear wheel 14 is illustrated in FIG. 1, it being understood that the braking of the left rear wheel is identical in form. The right rear wheel 14 includes an electrically operated brake 16 which may take the form of an electrically operated drum brake in which braking torque is established by operation of a DC torque motor and at a value proportional to the torque output of the DC torque motor. This electric brake may take the form as illustrated in U.S. application Ser. No. 525,386 filed May 18, 1990 and assigned to the assignee of this invention. The electric brake 16 is controlled by means of an electronic controller 18. During normal vehicle braking, the controller 18 responds to the pressure applied to the brake pedal 12 by the vehicle operator as measured by a force transducer 20 and controls the current to the torque motor of the electrically operated brake 16 so as to establish a braking pressure proportional to the pressure applied by the operator to the brake pedal 12. Braking pressure is similarly established at the other rear wheel.

To provide the parking brake function in accord with this invention, additional inputs are provided to the electronic controller 18. These inputs include the output of a manually operable parking brake switch 22 operated by the vehicle operator to initiate and disable the parking brake function, the output of a conventional normally closed brake switch 24 that is held open by the pedal 12 at its released position in the absence of an applied pressure by the vehicle operator and is closed when the operator actuates the pedal 12, a normally open switch 26 positioned to be closed by the brake pedal 12 at the end of its travel. The electronic controller 18 further monitors the speed $W_{RR}$ of the right rear wheel 14 via a speed sensor 28 and signal conditioner 30, the output of which comprises a squarewave signal having a frequency proportional to the speed of the right rear wheel 14. The wheel speed assembly 28 is standard and takes the form of a speed sensor typically used in antilock control systems for monitoring wheel speed. The speed $W_{LR}$ of the other rear wheel is similarly monitored.

In response to the various input signals, the electronic controller 18 controls the current to the motors of the rear electric brakes of the rear wheels to provide for normal braking based on the pedal pressure measured by the force sensor 20 and controlled parking brake pressure when commanded by the vehicle operator or in response to a failure of the front wheel hydraulic brakes.

The electronic controller 18 takes the form of a standard digital computer such as a Motorola MC68HC11 microcomputer along with the standard interface and driver circuits for interfacing and conditioning the input and output signals. For example, the output motor current commands of the microcomputer may be provided to motor driver interface circuits and H-switch drivers to provide signals for controlling the motors associated with the electric brakes of the rear wheels such as the electric brake 16. The driver interface and H-switch driver for controlling the motors may take the form of the driver illustrated in the U.S. Pat. No. 4,835,695, issued May 30, 1989.

Figure 2:
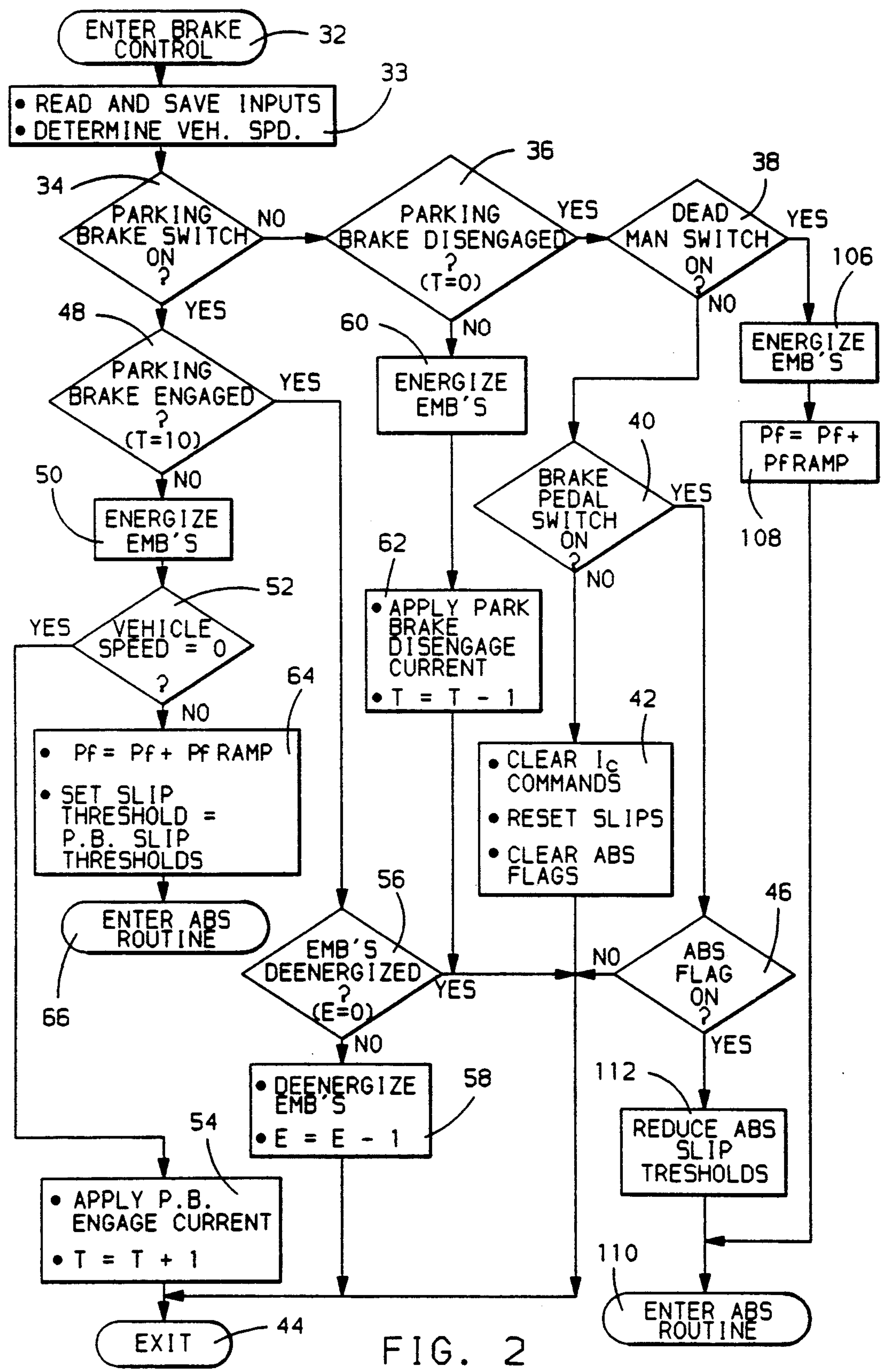
FIGS. 2 and 3 are flow diagrams illustrating the operation of the electronic controller of FIG. 1 in accord with the principles of this invention
Figure 3:
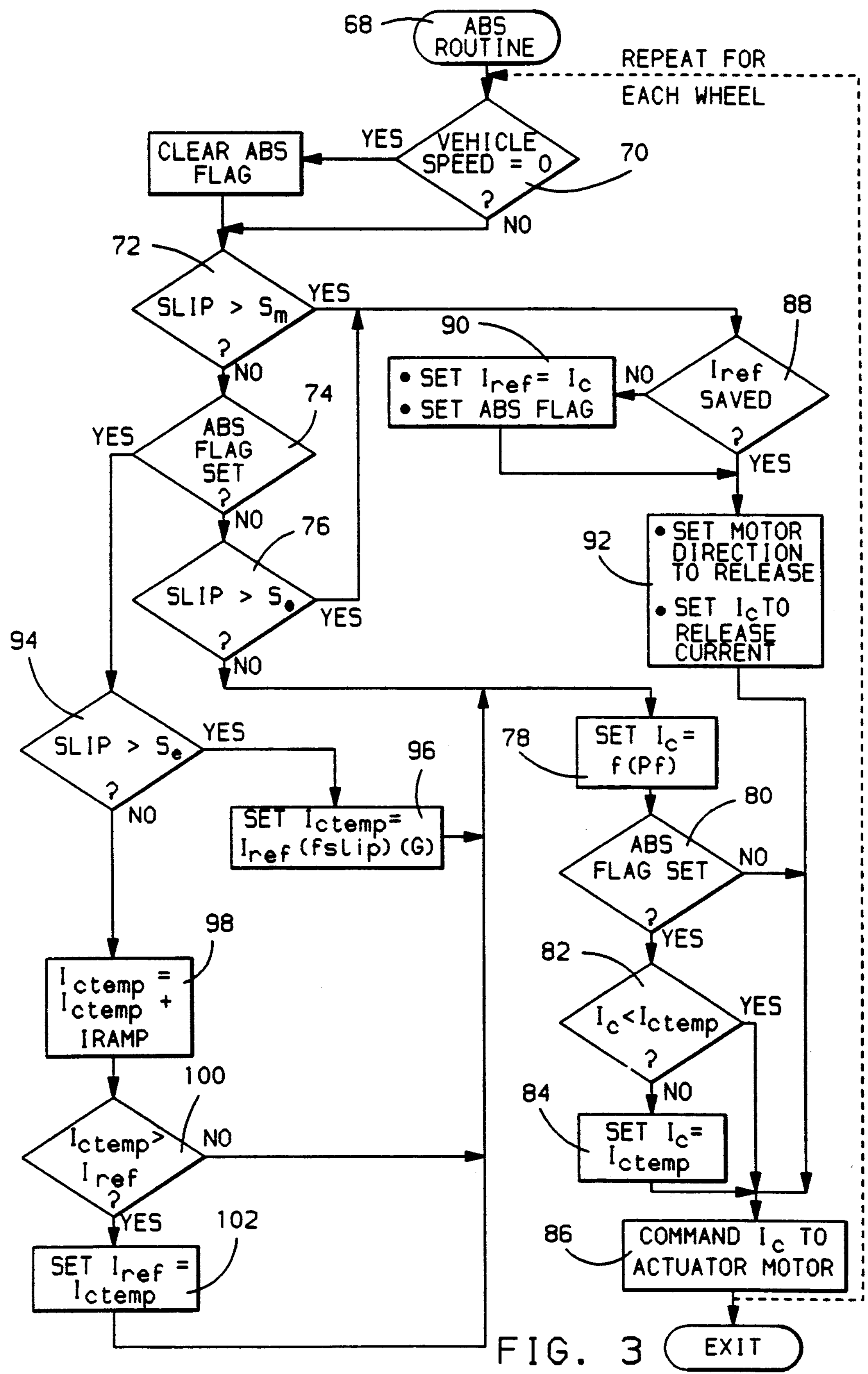

The operation of the electronic controller 18 in controlling the motors associated with the electric brakes of the rear wheels in accord with this invention is illustrated in FIGS. 2 and 3. The microcomputer contained within the electronic controller 18 has stored therein the instructions necessary to implement the algorithms as diagrammed in those figures. When power is first applied to this system from a vehicle battery (not shown) the computer program is initiated. The program may first provide for initialization of various random access memory variables to calibrated values and other functions. When this initialization routine is completed, the program then proceeds to perform brake control functions by executing a control cycle in response to each of repeated control cycle interrupts which are generated by the microcomputer of the electronic controller 18 at predetermined fixed time intervals such as 8 milliseconds. Upon the occurrence of a control cycle interrupt, the microcomputer begins executing the functions embodied in the control cycle. This control cycle includes the parking brake control routine of FIG. 2 and the antilock brake control routine of FIG. 3.

Referring now to FIG. 2, in response to a control cycle interrupt, the parking brake routine is entered at step 32 and proceeds to read and save the various input signals including the state of the various switches, the value of the brake pedal force F and the wheel speeds. Also at this step, the value of vehicle speed is determined. This may be based on the speed of the undriven wheels. Assuming first that (A) the operator has not actuated the parking brake switch 22 to command actuation of the electric brakes to apply parking brake pressure, (B) the vehicle operator is not applying pressure to the brake pedal 12 and (C) the parking brake function is fully disengaged such that no current is being applied to the electric motor of the electric brakes of the rear wheels. With these conditions, the parking brake switch 22 is off, the brake pedal switch 24 is off and the deadman switch 26 if off. This inactive condition of the vehicle braking system is detected by the steps 34, 36, 38 and 40 after which the program then proceeds to a step 42 where the current commands $I_c$ the motors of the electric rear brakes are set to zero, slip commands for the rear wheels are reset to normal antilock brake controlled slip values and an ABS active flag associated with the anti-lock brake routine of FIG. 3 is cleared. The program then exits the routine at step 44 and returns to the control cycle interrupt routine. The foregoing steps 34 through 40 are continually repeated as long as the assumed initial conditions remain the same.

Assuming now that the vehicle operator applies pressure to the brake pedal 12 to actuate the vehicle brakes thereby opening the brake switch 24, the program proceeds from steps 34, 36, 38 and 40 to a step 46 where the state of the ABS flag is sampled. As will be described, this flag will be set when the antilock brake routine of FIG. 3 operates to control and limit the slip of the rear wheels. Assuming the flag is reset, the program exits the routine at step 44. It is understood, that a normal base braking routine is further executed in the control cycle to apply pressure to the rear electric brakes by controlling current to the motors therein at a value proportional to the force F applied to the brake pedal 12.

The foregoing steps represent the operation of the vehicle brakes during normal vehicle braking. It will now be assumed that the brake pedal is not actuated, and the vehicle operator commands parking brake pressure application by closing the parking brake switch 22. This condition is sensed at step 34 after which the program proceeds to a step 48 which determines whether or not the parking brake pressure is now fully applied. In general, the parking brake is considered to be fully applied by applying a parking brake engage current to the motors of the electric rear brakes for a duration of a predetermined number of control cycle interrupts such as 10 while the vehicle speed is at zero.

Assuming initially that the parking brake switch 22 has been just been actuated, the program proceeds to a step 50 where electromagnetic brakes in the motor actuators of the electric rear brakes are energized to allow the motor output shafts to rotate. When deenergized, these brakes lock the motor shafts to prevent their rotation. The DC torque motors including such electromagnetic brakes may take the form as illustrated in U.S. application Ser. No. 352,971 filed May 17, 1989 and assigned to the assignee of this invention. After energizing the electromagnetic brakes to allow rotation of the torque motors of the electric brakes, the program determines at step 52 whether or not the vehicle speed is zero Assuming first that the vehicle is at rest, the program proceeds to a step 54 where the parking brake engage current is commanded to the torque motors of the rear electric brakes to apply maximum braking pressure and a count T representing a counted number of control cycle interrupts is incremented. Thereafter, the program exits the routine at step 44.

The foregoing steps 34, 48, 50, 52 and 54 are continually repeated with each control cycle interrupt until the predetermined number of control cycle interrupts (10 in this embodiment) has been counted at step 54. As indicated, this number represents the time required for the electric motors of the electric rear brakes to fully apply the commanded brake pressure associated with the parking brake engage current established at step 54. When this condition is sensed at step 48, the program proceeds to deenergize the electromagnetic brakes of the electric brake actuators so as to lock the motor output shafts of each rear brake against rotation. This provides for holding the park brake pressure even in the absence of current applied to the respective motors of the electric rear brakes. It is assumed that the duration of a predetermined number of control cycle interrupts is required to assure deenergization of the electromagnetic brakes and therefore the locking of the motor output shafts against rotation. Expiration of this duration is represented by a count E of control cycle interrupts having an initial value such as 3 being equal to zero. Assuming the count is not zero, the program proceeds to a step 58 where the electromagnetic brakes are deenergized and the count E is decremented. Once the electromagnetic brakes have been deenergized for the required number of control cycle interrupts, the program then proceeds directly from step 56 to exit the routine at step 44. Thereafter as long as the park brake switch 22 remains closed, the program proceeds to execute steps 34, 48 and 56 to maintain the parking brake pressure applied.

It is now assumed that the operator opens the park brake switch 22 to disengage the parking brake. This condition is sensed at step 34 after which the program samples the control cycle count T at step 36. Recalling that T was incremented to a value such as 10 at step 54 when the parking brake was engaged, the value of T being greater than zero indicates that the parking brake is not disengaged so that the program proceeds to a step 60 at which the electromagnetic brakes are energized to allow motor rotation and then to step 62 where the park brake disengage current is applied to the electric motors of the electric rear brakes and the count T is decremented. The park brake disengage current may be a reverse motor current to quickly retract the motors to release the brake pressure applied to the rear wheels. Thereafter, the program exits the routine at step 44. The steps 34, 36, 60 and 62 are thereafter repeatedly executed with each control cycle interrupt until such time that the count T has been decremented to zero indicating a time lapse sufficient to fully remove all parking brake pressure applied to the rear wheels. When this condition is sensed, and further assuming that the brake switch 24 and dead man switch remain open, the current commands $I_c$ to the motors of the electric brakes a re set to zero, the slip commands are reset and ABS flags are cleared at step 42 as previously described. Thereafter, the program exits the routine at step 44.

The foregoing steps generally depict the actuation and release of the parking brakes under control of the vehicle operator via the parking brake switch 22 while the vehicle is at rest. However, if the vehicle operator closes the switch 22 to command application of the parking brakes while the vehicle is moving depicting an emergency braking request, the program provides for controlled ramping of the pressure applied to the rear wheels while an antilock braking routine monitors the slip of the wheels and limits the brake pressure so as to provide controlled rear wheel slip. By limiting the pressure and providing for controlled wheel slip, the program provides for adapting the application of parking brake pressure to the road surface condition so that the parking brake pressure does not result in wheel slip exceeding a critical slip resulting in the rear wheels decelerating to a wheel lockup condition.

Returning now to step 52, if the vehicle is not at rest, the program proceeds to a step 64 where a commanded brake pressure Pf is ramped by adding a value $Pf_{ramp}$ to the old commanded value. Further, step 54 sets slip thresholds to be used in the antilock braking routine at a parking brake slip threshold which may be somewhat larger than the slip thresholds used in normal antilock brake control. This provides for a more aggressive braking of the rear wheels. Thereafter, the program enters the antilock braking routine at step 66 to control the applied pressure to the rear brakes in accord with the commanded pressure Pf but limited to limit the slip at controlled values according to the thresholds set at step 64.

Referring to FIG. 3, the antilock brake routine for controlling the brake pressure of each of the vehicle rear wheels is illustrated. This routine, which is repeated once for each wheel during each control cycle using the parameters associated with the selected wheel, is entered at step 68 and proceeds to step 70 to determine whether or not the vehicle speed is yet zero. Assuming initially that the vehicle speed is not zero, the program determines whether or not the wheel slip value indicates a need for brake pressure regulation to prevent wheel lookup. In general, the parking brake pressure applied to the rear wheels is released when the wheel slip exceeds a predetermined maximum value $S_m$ such as 20% and further provides for releasing the brakes for a single control cycle when the wheel slip first exceeds a lower desired controlled value $S_e$ such as 5%. Wheel slips are computed based on the measured wheel speed and an estimated vehicle speed such as commonly done in antilock braking systems.

First assuming that the maximum slip $S_m$ has not been exceeded, the program proceeds from step 72 to a step 74 where the state of the ABS flag is sensed. Assuming that the parking brake pressure has not yet been limited to control wheel slip so that the ABS flag is reset, the program proceeds to step 76 to determine whether or not the slip exceeds the slip value $S_e$. If not, the current command to the motors in the electric rear brakes is set at a value that is a function of the command value Pf set at step 64. This provides for a park braking effort that is ramped progressively as the value of Pf is ramped via step 64 during repeated executions of the control cycle. Thereafter the ABS flag is again sampled at step 80. Again assuming that the ABS routine has not been enabled to limit pressure to control wheel slip, the program proceeds to a step 82 where the commanded motor current $I_c$ is compared with a current command $I_{ctemp}$ to be described. If $I_{ctemp}$ is less than Ic set at step 78, Ic is set to the lesser value at step 84. In other words, steps 82 and 84 limit the value of $I_c$ at $I_{ctemp}$. Thereafter at step 86, the current $I_c$ is applied to the DC torque motor to apply a brake pressure that is proportional to the commanded current $I_c$. In general, as long as $I_c$ is less than $I_{ctemp}$, the parking brake pressure applied to the rear wheels is ramped as the value of Pf is ramped at step 64 of FIG. 2 to progressively increase the brake pressure applied to the electric rear brakes. As indicated, the routine is then repeated for the other rear wheel using its parameters and establishing its braking effort so that each wheel is braked independently.

Returning again to step 76, when the brake pressure applied to the rear wheel under consideration has been ramped to a value such that the wheel slip exceeds the threshold $S_e$, the program proceeds to store as a current reference value $I_{ref}$ the commanded motor current value $I_c$ then existing and which produced the wheel slip $S_e$. This current $I_{ref}$ is saved via steps 88 and 90 at which time the ABS flag is also set indicating the parking brake pressure is being regulated to limit and control wheel slip. Once the reference current is saved, the motor direction is set to release at step 92 and the commanded current $I_c$ is set to a release current value and the motor direction is set to release to reverse the motor direction and reduce braking pressure. Thereafter, the commanded current in the reverse direction is applied to the respective motor at step 86.

During the next execution of the control cycle, the set condition of the ABS flag is sensed at step 74 after which the program proceeds to set the value of $I_{ctemp}$ at a value $I_{ref}$slip)*G where $I_{ref}$ is the value stored at step 90, f(slip) is a slip function such as (1-slip) and G is a gain factor. In general, as long as slip is greater than $S_e$ and less $S_m$, the steps 94 and 96 modulate the value of $I_{ctemp}$ as a function of slip. The slip term (1-slip) is such that as slip decreases, the value of $I_{ctemp}$ increases. Thereafter at step 78, the program proceeds to set the value of Ic according to the ramped value of Pf. $I_c$ is then limited to the lesser of $I_c$ as determined at step 78 or $I_{ctemp}$ determined at step 96. In this way even though the ramped pressure Pf calls for a higher brake pressure value, the brake pressure is limited based on wheel slip by utilizing the lesser value $I_{ctemp}$. This value is then commanded to the motor at step 86.

Returning to step 94, anytime that the slip should become less than the threshold value $S_e$, the value $I_{ctemp}$ is ramped at a step 98 by adding to it the value IRAMP. If the ramped value of $I_{ctemp}$ should exceed the stored value of $I_{ref}$, $I_{ref}$ is set equal to $I_{ctemp}$ via steps 100 and 102. Thereafter, the program establishes the commanded current value $I_c$ via the steps 78, 80, 82 and 84 as previously described at the lesser of $I_c$ established from Pf or $I_{ctemp}$.

As long as the slip is less than the slip threshold $S_e$, the brake pressure is ramped via repeated executions of the routine until such time that the slip becomes greater than $S_e$. When step 94 senses this condition, step 96 then establishes the limit pressure $I_{ctemp}$ via step 96.

If at anytime the slip should exceed the absolute maximum value $S_m$ as sensed at step 72, a new value of $I_{ref}$ is established via steps 88 and 90 followed by a release of parking brake pressure via steps 92 and 86. When the wheel recovers as indicated by step 72 sensing the slip is less than $S_m$, the foregoing steps 94 through 102 are then executed to control the brake pressure as previously described. When the vehicle speed is reduced to zero as a result of the controlled application of the emergency brake pressure, the ABS flag is cleared at a step 104 of the ABS routine. Returning again to FIG. 2, when step 52 senses the vehicle speed has been reduced to zero by application of the parking brake pressure the parking brake engage current is applied for the specified time period and the motor electromagnetic brakes deenergized as previously described to complete the parking brake application.

What has been described provides for a parking brake function responsive to the operation of the parking brake switch 22 both when the vehicle is at rest and while the vehicle is moving.

However, the system of this invention further provides for automatically applying the parking brake when a failure of the front wheel hydraulic brakes is sensed. This failure is indicated by closure of the deadman switch 26 which is closed at the end of travel of the brake pedal 12. If the parking brake switch is open (step 34) and the parking brake is disengaged (step 36), this condition is sensed at step 38 at which time the electromagnetic brakes are energized at a step 106 to unlock the electric rear brake motor actuators followed by a ramping of the value of brake pressure Pf at a step 108. Thereafter the ABS routine is executed as previously described wherein the brake pressure is ramped according to the value Pf but limited as previously described when the slip exceeds the ABS slip threshold $S_e$. The slip threshold $S_e$ normally utilized by the ABS routine of FIG. 3 may be lower than the slip threshold established via step 64 for the parking brake function responsive to the parking brake switch 22. In another embodiment, step 108 could further provide for the setting of other desired slip thresholds to be used for applying the parking brakes upon the sensing of the failure of the front hydraulic brakes. Via execution of the foregoing steps as long as the deadman switch is on, the brake pressure is increased and then regulated based on wheel slip to bring the vehicle to a stop.

If at any time the vehicle operator should reduce the pressure on the brake pedal 12 and the switch 26 is opened, the program proceeds from the step 38 to the step 40 where the brake pedal switch 24 is sampled. If the brake pedal is still operated, the program samples the ABS flag at step 46. This flag will be "ON" if the ABS routine executed from step 110 operated to limit brake pressure to limit and control wheel slip. Assuming the flag is "ON", the ABS thresholds are reduced at step 112 to reduce the aggressiveness of the braking applied to the electric rear brakes by reducing the slip threshold and thereby controlling the pressure to a lower value associated with the lower slip thresholds. If, however, step 46 determines that the ABS flag is not "ON", the program then proceeds to exit the routine at step 44 and the last commanded motor current value $I_c$ is not altered. The vehicle operator may at any time terminate the passive automatic parking brake function by releasing all pressure on the brake pedal 12 so that the switch 24 is opened. This condition is sensed at step 40 after which step 42 clears the motor current commands.

The foregoing description of a preferred embodiment of the invention for purposes of illustrating the invention is not to be considered as limiting the invention since many modifications may be made by the exercise of skill in the art without departing from the scope of the invention.

The embodiments of the invention in which an exclusive property or privilege is claimed are defined as follows:

1. A parking brake system for controlling parking brake pressure to a wheel of a vehicle, comprising in combination:

signaling means selectively operable between a first state to signal park brake pressure apply and a second state to signal park brake pressure release;

means for determining wheel slip;

means responsive to the signaling means operated to the first state for (A) applying a progressively increasing parking brake pressure to the wheel and (B) limiting the progressively increased parking brake pressure at a value to establish the determined wheel slip at a predetermined wheel slip; and means responsive to the signaling means operated to the second state for removing park brake pressure to the wheel.

2. A parking brake system for controlling parking brake pressure to a wheel of a vehicle, comprising in combination:

signaling means selectively operable between a first state to signal parking brake pressure apply and a second state to signal parking brake pressure release;

means for sensing vehicle speed;

means for determining wheel slip;

means responsive to the signaling means operated to the first state for (A) applying a parking brake pressure to the wheel at a value to establish the determined wheel slip at a predetermined wheel slip while the sensed vehicle speed is greater than zero and (B) applying a maximum predetermined parking brake pressure to the wheel while the sensed vehicle speed is zero; and means responsive to the signaling means operated to the second state for removing parking brake pressure to the wheel.

3. A parking brake system for controlling parking brake pressure of a vehicle having front and rear wheels and an operator actuated hydraulic braking system for the front wheels, comprising in combination:

means for determining wheel slip for each of the rear wheels;

means for sensing a failure in the hydraulic braking system for the front wheels while the hydraulic braking system is actuated; and means responsive to a sensed failure in the hydraulic braking system for the front wheels for applying parking brake pressure to each one of the vehicle rear wheels at a value to establish its determined wheel slip at a predetermined wheel slip value.

4. A parking brake system for controlling parking brake pressure of a vehicle having front and rear wheels and a hydraulic braking system for the front wheels operated by a brake pedal, comprising in combination:

a parking brake switch selectively operable between a first state to signal parking brake pressure apply and a second state to signal parking brake pressure release;

a deadman switch having a normal first state and operated to a second state by the brake pedal when the brake pedal is moved to an end of limit travel indicating a failure of the hydraulic braking system for the front wheels;

means for determining wheel slip for each of the rear wheels;

means responsive to either one of (A) the parking brake switch operated to the first state and (B) the deadman switch operated to the second state by the brake pedal for applying parking brake pressure to each one of the vehicle rear wheels at a value to establish its determined wheel slip at a predetermined wheel slip value.

5. A method of controlling parking brake pressure to a wheel of a vehicle in response to a signaling means selectively operable between a first state to signal park brake pressure apply and a second state to signal park brake pressure release, the method comprising the steps of:

determining wheel slip:

applying a progressively increasing parking brake pressure to the wheel in response to the signaling means operated to the first state;

limiting the progressively increased parking brake pressure at a value to establish the determined wheel slip at a predetermined wheel slip; and removing park brake pressure to the wheel in response to the signaling means being operated to the second state.

6. A method of controlling parking brake pressure to a wheel of a vehicle in response to a signaling means selectively operable between a first state to signal park brake pressure apply and a second state to signal park brake pressure release, the method comprising the steps of:

sensing vehicle speed;

determining wheel slip;

in response to the signaling means operated to the first state, (A) applying a parking brake pressure to the wheel while the sensed vehicle speed is greater than zero at a value to establish the determined wheel slip at a predetermined wheel slip and (B) applying a maximum predetermined parking brake pressure to the wheel while the sensed vehicle speed is zero; and in response to the signaling means operated to the second state, removing parking brake pressure to the wheel.

7. A method of controlling parking brake pressure of a vehicle having front and rear wheels and an operator actuated hydraulic braking system for the front wheels, comprising in combination:

determining wheel slip for each of the rear wheels;

sensing a failure in the hydraulic braking system for the front wheels while the hydraulic braking system is actuated; and applying parking brake pressure to each one of the vehicle rear wheels at a value to establish its determined wheel slip at a predetermined wheel slip value in response to a sensed failure in the hydraulic braking system for the front wheels.

* * * * *